Patented Apr. 10, 1951

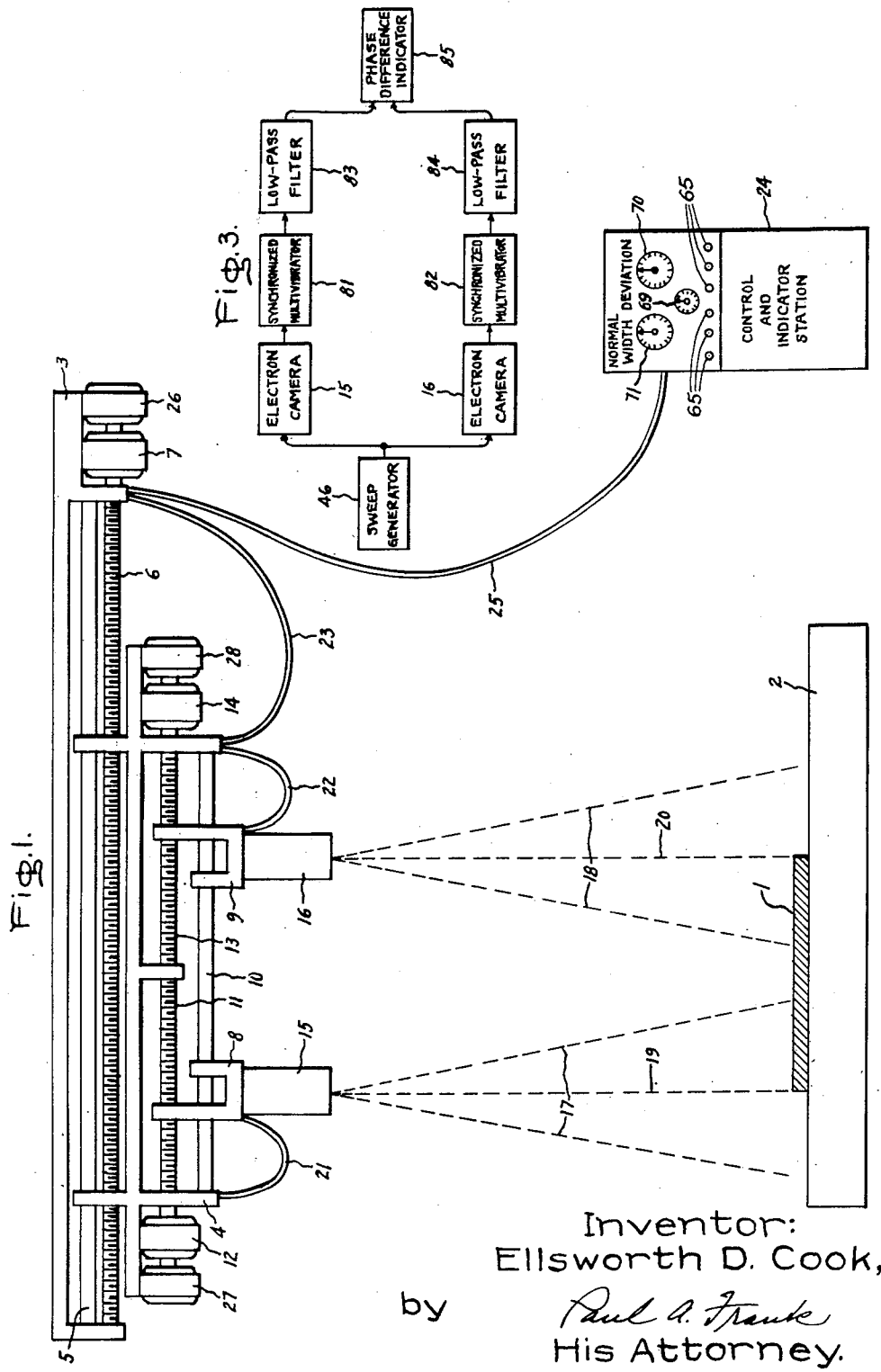

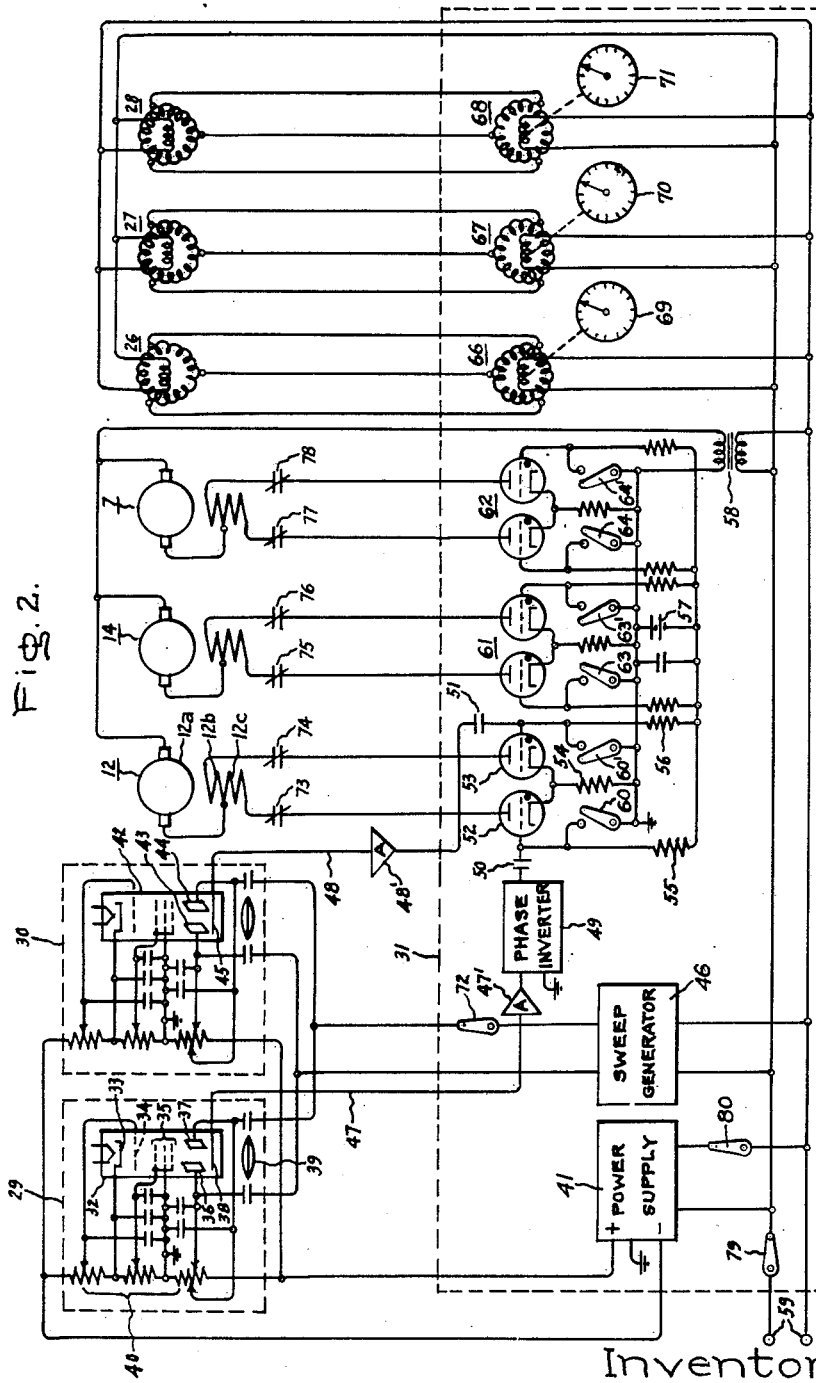

2,548,590

UNITED STATES PATENT OFFICE 2,548,590

NONCONTACTING WIDTH GAUGE

Ellsworth D. Cook, Scotia, N. Y., assignor to General Electric Company, a corporation of New York Application April 1, 1950, Serial No. 153,412

12 Claims. (Cl. 250—219)

This invention relates to improved non-contacting gages for measuring the width of objects, and in particular to improved gages for continuously measuring the width of moving sheet material, such as steel strip in a rolling mill.

In the manufacture of steel strip, it is desirable to have some means for continuously measuring the width of the steel strip as it is rolled in the mill so that any deviations from the normal or desired width can be quickly corrected before a substantial amount of offsize strip is produced. Such measuring means must be readily and quickly adjustable for the measurement of different normal or desired widths between successive runs. The conditions under which such measurement must be made demand rugged equipment, especially in a hot strip mill where, in addition to moving at high speed, the steel strip may be at a very high temperature. Furthermore, the motion of the strip is apt to be erratic. The strip, especially in the case of a hot strip mill, may move vertically and laterally as well as longitudinally. Under such conditions, gages which physically contact the strip are impractical.

An object of this invention is to provide an improved non-contacting width gage adapted to continuously measure the width of sheet material under adverse measurement conditions, such as may be encountered in steel rolling mills. Other objects and advantages will appear as the description proceeds.

The features of this invention which are believed to be novel and patentable are pointed out in claims which form a part of this specification. For a better understanding of the invention, reference is made in the following description to the accompanying drawings, in which Fig. 1 is a schematic view of an improved non-contacting width gage; Fig. 2 is a circuit diagram of the gage; and Fig. 3 is a block diagram of a circuit modification of the gage.

Referring now to Fig. 1, an object, the width of which is to be measured, may be a steel strip 1 in a steel rolling mill. In a hot strip mill, the width gage may be located after one of the roughing stands and over the runout table. One of the rolls of the run-out table is illustrated at 2. The gage includes a supporting member 3 which is supported in any suitable manner above steel strip 1. A carriage 4 is supported by and movable laterally relative to supporting member 3. One or more rods 5 or tracks are provided to support carriage 4. The carriage moves by sliding along rod 5. Lateral movement of carriage 4 is produced by a lead screw 6 rotated by a reversible electric motor 7.

Two smaller carriages 8 and 9 are supported by and independently movable laterally relative to carriage 4. Carriages 8 and 9 are supported by and movable along one or more rods 10, or suitable tracks. Lateral movement of carriage 8 is produced by a lead screw 11 rotated by a reversible electric motor 12. Movement of carriage 9 is produced by a lead screw 13 rotated by a reversible electric motor 14.

Electron cameras 15 and 16 are mounted upon carriages 8 and 9, respectively. The electron cameras each comprise an electron camera tube, such as an iconoscope, orthicon, or image dissector, and may be similar to cameras used as television pickups. Cameras 15 and 16 have fields of view represented by broken lines 17 and 18, respectively. Cameras 15 and 16 are positioned to view respective opposite edges of strip 1 along substantially parallel lines of sight, represented by broken lines 19 and 20. It will be appreciated that the object being measured may supply its own illumination; otherwise, means of illuminating the strip must be provided externally.

Electrical connections are made between camera 15 and carriage 4 by a cable 21, between camera 16 and carriage 4 by a cable 22, between carriage 4 and supporting member 3 by a cable 23, and from supporting member 3 to a control and indicator station 24 by a cable 25. Selsyn transmitters 26, 27 and 28 are connected to motors 7, 12 and 14, respectively, to provide remote indications of the carriage positions as hereinafter explained.

Fig. 2 is a circuit diagram of the improved gage. Broken line 29 encloses the components which may be contained in the housing of camera 15, broken line 30 encloses the components which may be contained in the housing of camera 16, and broken line 31 encloses the components which may be placed at the control and indicator station 24. The control and indicator components need not all be placed within a common housing; some of the components may be placed in the steel mill motor room, while the indicators and other components may be placed on the mill floor at a location convenient for the operator. Duplicate indicators may be provided at other places, such as the mill superintendent's office, and recorders may be added to provide permanent records, if desired.

Camera 15 comprises an electron camera tube 32, which may be an iconoscope designed for industrial use. The iconoscope has a cathode 33, a control grid 34, accelerating electrodes 35, electrostatic deflecting plates 36 and 37, and a photosensitive mosaic 38. A lens 39 is provided to focus an optical image of the object viewed upon photosensitive mosaic 38. Operating potentials for the various iconoscope electrodes may be obtained in conventional manner from a voltage divider 40 across which a large direct voltage is provided by a power supply 41 of conventional type. Similar components including an iconoscope 42 having electrostatic deflecting plates 43 and 44 and a photosensitive mosaic 45 are comprised in camera 16.

The optical images of opposite edges of strip 1 are formed upon mosaics 38 and 45, respectively. Simultaneous lateral scanning of these images is accomplished by simultaneously applying between deflecting plates 36 and 37, and between deflecting plates 43 and 44, a deflection voltage such as a sawtooth waveform voltage obtained from a conventional sweep generator 46. No longitudinal scanning of the images is necessary since this is taken care of by movement of strip 1 relative to the cameras.

Output electric signals are obtained from mosaics 38 and 45 of the electron cameras through connections 47 and 48, respectively. As the scanning of each image crosses an edge of strip 1, there is a large change or step in the output voltage obtained at connections 47 and 48. This voltage step is due to a large difference between the brightness of strip 1 and the brightness of the surroundings. When the strip is red hot or white hot, as it may be in a hot strip mill, the self luminosity of strip 1 produces this difference in brightness. If the strip is cold, the brightness difference can be produced by suitable illumination.

If the width of strip 1 is exactly equal to the distance between centers of cameras 15 and 16, the voltage changes or steps at connections 47 and 48 occur simultaneously. The effect of vertical motion of the strip is minimized by using a camera directly over each edge of the strip. However, if the width of strip 1 deviates from such equality, one of the voltage changes or steps occurs before the other so that the time relation of these voltage steps corresponds to amounts of deviation in the width of strip 1. Because the two edges of strip 1 are viewed by the two cameras along parallel lines of sight, sidewise or vertical motion of the strip has little effect upon the sequence of the voltage steps at connections 47 and 48 since the scanning operations start for a fixed time reference and proceed in the same direction. Amplifiers 47' and 48' may be provided to amplify the electric signals provided by the electron cameras.

Since one of the images is scanned from a darker to a brighter region, and the other image is scanned from a brighter to a darker region, one of the voltage steps is of negative polarity while the other is of positive polarity. Therefore, a phase inverter 49, which may be a vacuum tube amplifier having unity gain, is connected to invert the polarity of one of the voltage steps so that both steps have positive polarity. The two positive voltage steps are applied through capacitors 50 and 51 respectively to the control electrodes of thyratrons 52 and 53. The cathodes of thyratrons 52 and 53 are connected to ground through a common cathode resistor 54. The control electrodes of thyratrons 52 and 53 are connected to ground through grid leak resistors 55 and 56, respectively, in series with a source of bias voltage such as battery 57.

Reversible electric motor 12 may have a wound armature 12a and a split field stator comprising windings 12b and 12c. Winding 12b is connected to the anode of thyratron 53, and winding 12c is connected to the anode of thyratron 52, as shown. Rotor 12a is connected between the center tap of the field windings and the secondary of a transformer 58, the primary of which is energized from any suitable alternating current source through terminals 59. Thus, alternating voltage is applied to the anode of thyratrons 52 and 53 through the windings of motor 12. Sweep generator 46 may be synchronized by conventional means to provide at least one complete scanning line during each positive half-cycle of alternating voltage applied to the anodes of the thyratrons.

At the beginning of each positive half-cycle of this alternating voltage, thyratrons 52 and 53 are non-conducting and are maintained non-conducting by the negative bias applied to their control electrodes by battery 57. Assume that a sudden voltage change or step occurs first at connection 47. This voltage step is inverted by phase inverter 49 and differentiated by capacitor 50 and resistor 55 so that a positive pulse of voltage is applied to the control electrode of thyratron 52. This pulse fires thyratron 52 so that it conducts current. The current conducted by thyratron 52 produces a voltage drop across cathode resistor 54, which, by raising the potential of its cathode, applies sufficient negative bias to thyratron 53 to keep this thyratron cut off despite the application of a subsequent positive pulse to its control electrode. Current therefore flows through winding 12c of motor 12, and not through winding 12b. This current continues to flow during the remainder of that particular alternating voltage half-cycle.

During the negative half-cycle of alternating voltage applied to the thyratron anodes, conduction of current through the thyratrons ceases, and the circuit is reset to its initial condition in which neither thyratron conducts current. If during the next positive half-cycle of the alternating voltage a sudden voltage change or step again occurs first in conductor 47, the same operation is repeated and current is again provided through winding 12c. Conversely, if the sudden voltage change or step occurs first in conductor 48, thyratron 53 is fired and current is conducted through winding 12b and not through 12c.

Currents through windings 12c and 12b respectively tend to produce operation of motor 12 in opposite directions. These currents are produced responsive to opposite deviations in the width of strip 1 from equality with the distance between centers of cameras 15 and 16. For example, current may be produced through winding 12c when strip 1 is wider than the distance between centers of the two cameras. This current causes motor 12 to operate and rotate lead screw 11 in a direction to move camera 15 away from camera 16, thus tending to make the distance between cameras equal to the width of strip 1. Current through winding 12b is produced by a width deviation in the opposite direction and tends to rotate motor 12 and lead screw 11 in a direction to decrease the distance between cameras 15 and 16. Thus, an automatic control system is provided which operates to maintain the distance between centers of cameras 15 and 16 exactly equal to the width of strip 1.

Switches 60 and 60' are provided so that the operator can operate motor 12 independently of the automatic control system. Switch 60 is connected between the control electrode of thyratron 52 and ground. When switch 60 is closed, the negative bias is removed from the control electrode of thyratron 52, and this thyratron fires. Switch 60' is connected between the control electrode of thyratron 53 and ground, and closing this switch fires thyratron 53. By closing switches 60 and 60' selectively, the operator can operate motor 12 in either direction, as desired.

Similar control circuits 61 and 62, respectively containing switches 63, 63', 64 and 64', may be provided for operating motors 7 and 14. In place of these control circuits, relays or any other control apparatus may be employed to operate motors 7 and 14. In Fig. 1, a plurality of push buttons 65 are shown for closing switches 60, 60', 63, 63', 64 and 64', respectively.

The relative positions of carriages 4, 8 and 9 may be indicated by suitable indexes and scales attached to the carriages. However, remote indication of the positions is preferable. For example, the indications may be provided at control and indicator station 24 through conventional remote indicating or telemetering apparatus. Such apparatus may include Selsyn transmitters 26, 27 and 28 connected to the shafts of motors 7, 12 and 14, respectively. These Selsyn transmitters are electrically connected in conventional manner to Selsyn receivers 66, 67 and 68 which may be located at the control and indicator station. The Selsyn receivers respectively operate indicators 69, 70 and 71, which indicate the relative positions of the carriages. Additional indications may be provided at other locations if desired, through conventional telemetering apparatus, and recorders may be added to provide permanent records of the indications.

In the usual operation of this equipment, steel strip 1 is rolled to a normal or desired width. The non-contacting width gage measures deviations from this normal width so that the operator is promptly notified of any excessive width deviations and can make required changes before an excessive amount of offside strip is produced. In setting up the apparatus, carriage 8 is moved to, or assumed to occupy, a position, preferably near the middle of lead screw 11, at which the indication of indicator 70 is zero. Indicator 70 may be called a width deviation indicator. Carriage 9 is then adjusted in position so that the distance between centers of cameras 15 and 16 is equal to the normal or desired width of strip 1. This distance is indicated by indicator 71, which may be called the normal width indicator. The position of carriage 4 is then adjusted to bring the two cameras 15 and 16 directly over opposite edges of strip 1, as shown in the drawing, Fig. 1. This adjustment is provided because of the fact that different strips will not occupy the same position on the run-out table rolls 2, one reason for such variation being to equalize the wear of the mill rolls. When the cameras are directly above the edges of the strip, vertical motion of the strip which may occur during rolling produces no error in the normal width indication. The position of carriage 4 is indicated by indicator 69. Indicator 69 is not essential and may be omitted.

After these adjustments have been made, switch 72 is closed, whereupon sweep generator 46 applies a deflection voltage such as a sawtooth waveform voltage to the deflecting plates of the iconoscopes. The images are then scanned and automatic operation takes place, as hereinbefore described, to move carriage 8 automatically by whatever amounts may be necessary to maintain the distance between centers of cameras 15 and 16 exactly equal to the width of strip 1. These changes in position of carriage 8 are indicated by indicator dial 70, which therefore indicates deviations in the width of strip 1 from the normal or desired width.

To prevent overtravel of the carriages which might damage the equipment, limit switches 73, 74, 75, 76, 77 and 78 may be connected in the motor leads as shown. These limit switches are arranged so that when a carriage reaches its maximum travel in either direction, the appropriate switch opens and prevents motor operation to produce further travel in that direction. An "on-off" switch 79 may be provided to turn the electric power to the entire gage on or off, selectively, and another "on-off" switch 80 may be provided for separate control of the high voltage power supply 41.

The gage which has been described has advantages of simplicity, ruggedness, and adaptability to easy servicing in the field, due largely to its partly mechanical operation. Its disadvantage is that sudden width deviations are not indicated instantly since deviations are not indicated until sufficient time has elapsed for movement of carriage 8. In certain applications, this disadvantage is not a serious one since only a few feet of offsize strip will pass the gage before the width deviation is indicated, even at high rolling speeds. However, practically instantaneous indications can be obtained with a modification employing an electronic deviation indicator.

When the electronic indicator is used, leads 47 and 48 are not connected to the control electrodes of thyratrons 52 and 53, and there is no automatic control of the position of carriage 8. In fact, motor 12 may be omitted, and carriage 8 may be permanently attached to or be a part of carriage 4. Otherwise, the apparatus may be the same as that shown in Figs. 1 and 2, with the electronic width deviation indicator circuit illustrated in Fig. 3 added.

Referring now to Fig. 3, sweep generator 46 provides lateral scanning in electron cameras 15 and 16 as in the previously described embodiment. However, the output electric signals from cameras 15 and 16 are used to trigger synchronized multivibrators 81 and 82. The multivibrators 81 and 82 are free-running at a frequency which is some multiple of the scanning rate of the electron cameras. These multivibrators are individually synchronized by the separate step voltages received from the cameras. Therefore, the electric signals produced by the multivibrators have equal frequencies and have a phase relationship determined by the sequence of the step voltages. Thus, if the cameras have been initially set to a separation exactly equaling the width of the strip being measured at the instant, the phase difference is zero. This phase difference, therefore, is related to the width deviations of strip 1 from the normal or desired width established by the spacing between cameras 15 and 16.

The output voltages of the multivibrators are rich in undesired harmonics. Preferably, these harmonics are removed by passing the output from the multivibrators through low pass filters 83 and 84, respectively, which transmit the fundamental frequency components and strongly attenuate the harmonics. The two signals transmitted by filters 83 and 84, therefore, are substantially sine waves having a phase relation which is determined by the time relation of the voltage steps produced by the electron cameras, and which therefore is determined by the width deviations of strip 1 from the normal or desired value. This difference in phase between the sine wave signals is indicated by a phase difference indicator 85, which may be any of the devices well known in the art for accurately measuring phase differences of two electric signals. Since this width difference indicator is completely electronic in operation, width deviations are indicated almost instantaneously.

Having described the principle of this invention and the best mode in which I have contemplated applying that principle, I wish it to be understood that the examples described are illustrative only, and that other means may be employed without departing from the true scope of the invention.

What I claim as new and desire to secure by Letters Patent of the United States is:

1. A non-contacting gage for measuring a dimension of an object, comprising two electron cameras positioned to view opposite edges of the object to be measured along parallel lines of sight, means to adjust the distance between said cameras to the normal value of the dimension to be measured, means for indicating the normal value of this dimension, means to provide simultaneous lateral scanning by said cameras of their respective fields of view, whereby said cameras produce electric signals as the respective edges of such object are scanned, the time relation of said signals depending upon deviation in such dimension from the normal value, and means responsive to the time relation of said signals for indicating such deviations.

2. A non-contacting gage, for measuring width of objects, comprising a supporting member, a first carriage supported by and movable laterally relative to said supporting member, second and third carriages each supported by and independently movable laterally relative to said first carriage, two electron cameras mounted upon said second and third carriages respectively, said cameras being positioned to view respective opposite edges of the object to be measured along parallel lines of sight, means to provide simultaneous lateral scanning by said cameras of their respective fields of view, whereby said cameras produce electric signals as the respective edges of such object are scanned, the time relation of such signals depending upon deviations in width of such object from equality with the distance between said cameras, and indicating means responsive to the time relation of said signals.

3. A non-contacting gage for measuring the width of objects, comprising two electron cameras positioned to view respective opposite edges of the object to be measured along parallel lines of sight, means to provide simultaneous lateral scanning by said cameras of their respective fields of view, whereby said cameras produce electric signals as the respective edges of such object are scanned, the time relation of such signals depending upon deviations in width of such object from equality with the distance between said cameras, a plurality of carriages supporting said cameras, at least one of said carriages being movable relative to the other carriage to adjust the normal distance between said cameras to equality with the normal width of the object to be measured, means for indicating the value of such normal width to which the apparatus has been adjusted, means for moving at least one other of such carriages relative to the other carriages responsive to the time relation of said electric signals to provide deviations in the distance between said cameras corresponding to deviations in the width of the object measured, and means for indicating values of such deviations.

4. A non-contacting gage for measuring the width of objects, comprising two electron cameras positioned to view respective opposite edges of the object to be measured along parallel lines of sight, means to provide simultaneous lateral scanning by said cameras of their respective fields of view, whereby said cameras produce electric signals as the respective edges of the object viewed are scanned, the time relation of said signals depending upon deviations in width of such object from equality with the distance between said cameras, a reversible electric motor connected to adjust the distance between said cameras, and control means for said motor responsive to the time relation of said signals for maintaining the distance between said cameras equal to the width of said object.

5. A non-contacting gage for measuring the width of objects, comprising two electron cameras positioned to view respective opposite edges of the object to be measured along parallel lines of sight, means to provide simultaneous lateral scanning by said cameras of their respective fields of view, whereby said cameras produce electric signals as the respective edges of the object viewed are scanned, the time relation of said signals depending upon deviations in width of such object from equality with the distance between said cameras, means to adjust the normal distance between said cameras to equality with the normal width of the object to be measured, means for indicating such normal width values, a reversible electric motor connected to provide deviations in the distance between said cameras, control means for said motor responsive to the time relation of said signals for maintaining the distance between said cameras equal to the width of said object, whereby the deviations in distance between the cameras equal the deviations in width of said object from the chosen normal, and means for indicating the values of such deviations.

6. A non-contacting gage for measuring width of objects, comprising two electron cameras positioned to view respective opposite edges of the object to be measured along parallel lines of sight, means to provide simultaneous lateral scanning by said cameras of their respective fields of view, whereby said cameras produce electric signals as the respective edges of such object are scanned, the time relation of such signals depending upon deviations in width of such object from a normal value, means including a reversible electric motor for adjusting the distance between said cameras, and a control circuit for said motor comprising two thyratrons connected to be fired selectively responsive to the time relation of such signals.

7. A non-contacting gage for measuring width of objects, comprising two electron cameras positioned to view respective opposite edges of the object to be measured along parallel lines of sight, means to provide simultaneous lateral scanning by said cameras of their respective fields of view, whereby said cameras produce electric signals as the respective edges of such object are scanned, the time relation of such signals depending upon deviations in width of such object from equality with the distance between said cameras, means to adjust the normal distance between the cameras to equality with the normal width of said object, means for indicating such normal width values, means including a reversible electric motor for further adjusting the distance between said cameras, a control circuit for said motor for producing deviations in the distance between cameras corresponding to deviations from the normal value in the width of said object, said control circuit comprising two thyratrons connected to be fired selectively responsive to the time relation of such signals, and means for indicating values of such deviations.

8. A non-contacting gage for measuring width of objects, comprising two electron cameras positioned to view respective opposite edges of the object to be measured along parallel lines of sight, a sweep generator connected to provide simultaneous lateral scanning by said cameras of their respective fields of view, whereby said cameras produce electric signals as the respective edges of such object are scanned, the time relation of such signals depending upon deviations in width of such object from equality with the distance between said cameras, means including an electric motor for adjusting the distance between said cameras, said motor being of the reversible type having split field windings, two thyratrons having their anodes connected to opposite field windings of said motor, said thyratrons having cathodes connected together through a common cathode resistor, connections for applying alternating voltage between the cathodes and anodes of said thyratrons through said motor windings, and connections for applying signals from said electron cameras to the control electrodes of said thyratrons, whereby said thyratrons are selectively fired depending upon the time relation of said signals and thereby operate said motor to adjust automatically the distance between said cameras to equality with the width of the object measured.

9. A non-contacting gage for measuring width of objects, comprising two electron cameras positioned to view respective opposite edges of the object to be measured along parallel lines of sight, a sweep generator connected to provide simultaneous lateral scanning by said cameras of their respective fields of view, whereby said cameras produce electric signals as the respective edges of such object are scanned, the time relation of such signals depending upon deviations in width of such object from equality with the distance between said cameras, means for adjusting the normal distance between said cameras to equality with the normal width of the object to be measured, means for indicating such normal width values, means including an electric motor for further adjusting the distance between said cameras, said motor being of the reversible type having split field windings, two thyratrons having their anodes connected to opposite field windings of said motor, said thyratrons having cathodes connected together through a common cathode resistor, connections for applying alternating voltage between the cathodes and anodes of said thyratrons through said motor windings, connections for applying electric signals from said electron cameras to the control electrodes of said thyratrons, whereby said thyratrons are selectively fired depending upon the time relation of said signals and thereby operate said motor to adjust automatically the distance between said cameras to equality with the width of the object measured so that deviations in the distance between said cameras correspond to deviations in the width of said object, and means for indicating quantitative values of such deviations.

10. A non-contacting gage for measuring width of objects, comprising two electron cameras positioned to view respective opposite edges of the object to be measured along parallel lines of sight, means to provide simultaneous lateral scanning by said cameras of their respective fields of view, whereby said cameras produce electric signals as the respective edges of such object are scanned, means to adjust the distance between said cameras to equality with the normal width of the object to be measured, means for indicating such normal width values, and means to measure and indicate the time relation of said signals thereby indicating deviations from the normal width.

11. A non-contacting gage for measuring width of objects, comprising two electron cameras positioned to view respective opposite edges of the object to be measured along parallel lines of sight, means to provide simultaneous lateral scanning by said cameras of their respective fields of view, whereby said cameras produce electric signals as the respective edges of such object are scanned, the time relation of said signals depending upon deviations in width of such object from equality with the distance between said cameras, two synchronized multivibrators connected for synchronization by the respective signals produced by said cameras, whereby said multivibrators produce electric signals having substantially equal frequencies and having a phase relationship determined by the time relation of the signals produced by said cameras and hence determined by deviations in width of the object measured, and a phase difference indicator connected to indicate the phase relation between the signals produced by said multivibrators.

12. A non-contacting gage for measuring width of objects, comprising two electron cameras positioned to view respective opposite edges of the object to be measured along parallel lines of sight, means to provide simultaneous lateral scanning by said cameras of their respective fields of view, whereby said cameras produce electric signals as the respective edges of such object are scanned, the time relation of said signals depending upon deviations in width of such object from equality with the distance between said cameras, means for adjusting the distance between cameras to equality with the normal width of the object to be measured, means for indicating such normal width values, two synchronized multivibrators connected for synchronization by the respective signals produced by said cameras, whereby said multivibrators produce electric signals having substantially equal frequencies and having a phase relationship determined by the time relation of the signals produced by said cameras and hence determined by deviations in width of the object measured, and a phase difference indicator connected to indicate the phase relation between the signals produced by said multivibrator and hence indicate the deviations in width of the object measured.

ELLSWORTH D. COOK.

REFERENCES CITED

The following references are of record in the file of this patent:

UNITED STATES PATENTS

| Number | Name | Date |
| --- | --- | --- |
| 2,208,447 | Berry | July 16, 1940 |
| 2,247,684 | Hickok | July 1, 1941 |
| 2,344,817 | Hlavaty | Mar. 21, 1944 |
| 2,355,363 | Christaldi | Aug. 8, 1944 |
| 2,443,634 | Morgan | June 22, 1948 |
| 2,444,261 | Kelling | June 29, 1948 |
| 2,474,906 | Meloon | July 5, 1949 |